Sept. 17, 1946.　　　　C. T. ASHBY　　　　2,407,733
TWO TEMPERATURE EVAPORATOR FOR INERT
GAS TYPE ABSORPTION REFRIGERATORS
Filed May 15, 1941　　　2 Sheets-Sheet 1

INVENTOR.
Carl T. Ashby
BY D. E. Heath
his ATTORNEY.

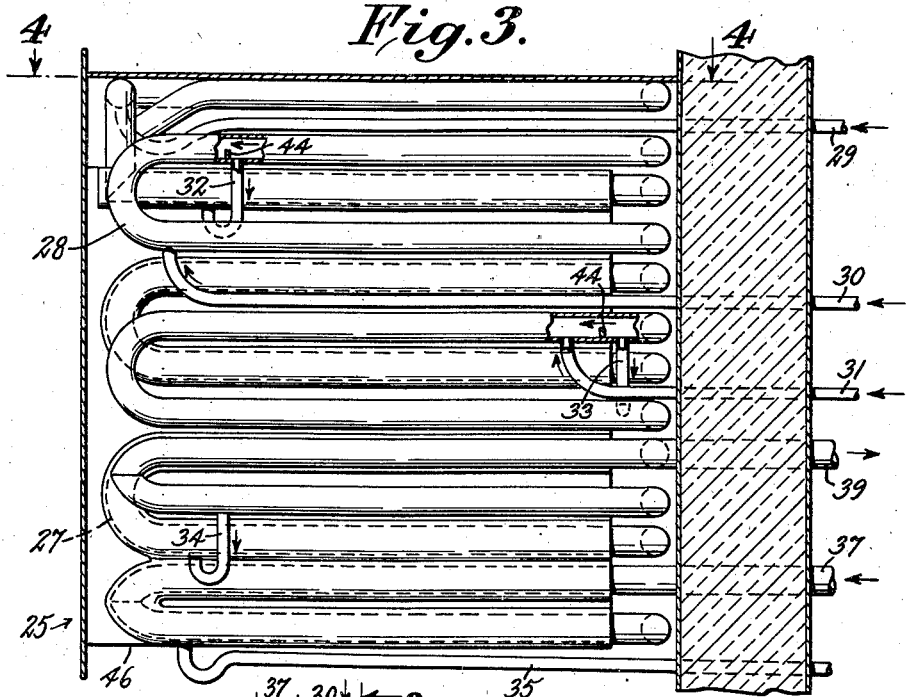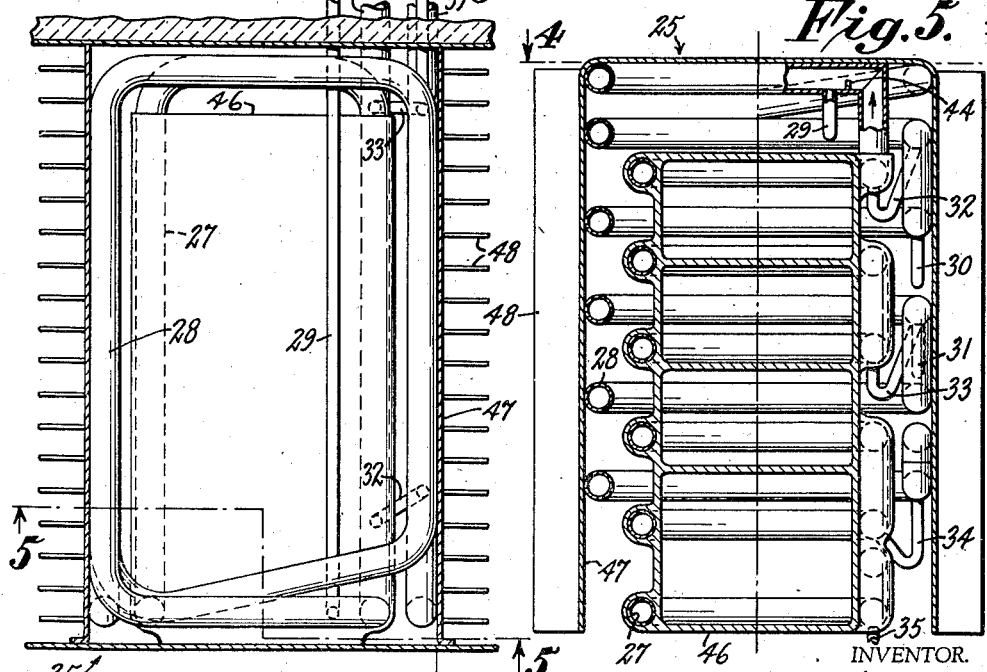

Patented Sept. 17, 1946

2,407,733

UNITED STATES PATENT OFFICE 2,407,733

TWO TEMPERATURE EVAPORATOR FOR INERT GAS TYPE ABSORPTION REFRIGERATORS

Carl T. Ashby, Evansville, Ind., assignor to Servel, Inc., New York, N. Y., a corporation of Delaware Application May 15, 1941, Serial No. 393,558

18 Claims. (Cl. 62—119.5)

My invention relates to refrigeration and more particularly to refrigeration produced by evaporation of liquid in the presence of auxiliary inert gas.

It is an object of the invention to produce refrigeration simultaneously at different temperatures and maintain a distinct differential between such temperatures.

It is another object to provide a coil type evaporator for pressure equalized refrigeration apparatus having distinct temperature zones.

It is another object to provide an evaporator for pressure equalized absorption refrigeration apparatus having high and low temperature zones with increased cooling capacity of the higher temperature zone.

The above, together with other objects and advantages, are more fully set forth and explained in the following description in connection with the accompanying drawings forming part of this specification and of which:

Fig. 3 is an enlarged view, partly broken away, of the cooling element shown in Fig. 2;

Fig. 4 is a sectional view taken on line 4—4 in Fig. 3; and

Fig. 5 is a sectional view taken on line 5—5 in Fig. 4.

Figure 1:
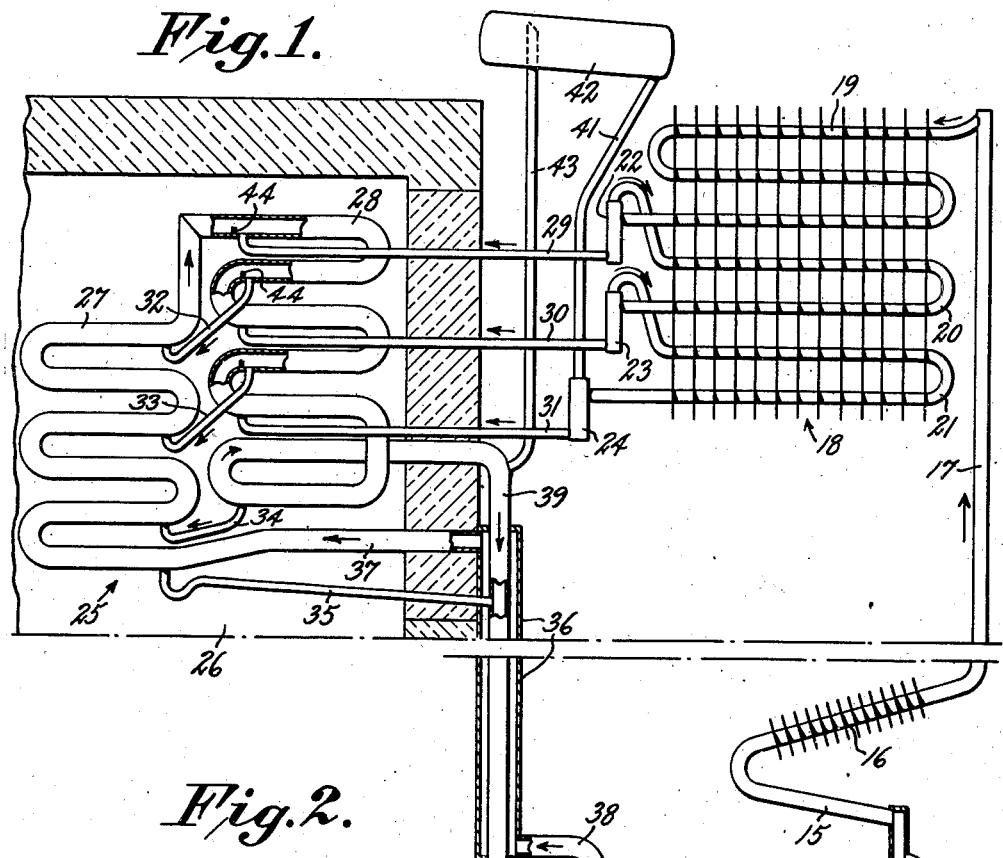
Fig. 1 shows more or less diagrammatically a refrigeration apparatus embodying the invention.

Referring to Fig. 1, the refrigeration system includes a generator 10 heated by suitable means such as a gas burner 11. The generator 10 is connected with an absorber 12 by conduits including a liquid heat exchanger 13 for circulation of absorption liquid through and between the generator and absorber. The generator 10 is provided with a vapor liquid lift 14 to carry out this liquid circulation in known manner. The absorber 12 is shown provided with a coil 12a for circulation of a cooling fluid. Fins could be used for direct air cooling of the absorber, as known.

The generator 10 is connected by a conduit 15, a rectifier 16, and a conduit 17 to the upper end of an air-cooled condenser 18. The condenser 18 comprises an upper section 19, an intermediate section 20, and a lower section 21. A liquid trap 22 is connected between the two upper condenser sections 19 and 20, a liquid trap 23 is connected between the two lower condenser sections 20 and 21. A liquid trap 24 is connected to the bottom condenser section 21.

A coil type evaporator 25 is located in a refrigerator storage compartment 26. Evaporator 25 comprises a coil section 27 forming one part and a coil section 28 forming other parts. A conduit 29 is connected from the condenser trap 22 to the upper part of coil section 28. Conduit 30 is connected from condenser trap 23 to an intermediate part of coil section 28. A conduit 31 is connected from condenser trap 24 to a bottom part of coil section 28. A downward looped conduit 32 is connected from the lower end of said upper part of coil section 28 to the upper end of coil section 27. A similar conduit 33 is connected from said intermediate part of coil section 28 to an intermediate turn in coil section 27. Another similar conduit 34 is connected from the lower end of said bottom part of coil section 28 to a lower turn of coil section 27. A drain conduit 35 is connected from the lower end of coil section 27 to the inner passage of a gas heat exchanger 36.

The upper end of coil section 27 is connected to the upper end of coil section 28 and the latter is located as a whole at a slightly higher elevation than that of coil section 27. The lower end of evaporator coil section 27 is connected by a conduit 37, outer passage of gas heat exchanger 36, and a conduit 38 to the upper part of absorber 12. The lower end of evaporator section 28 is connected by a conduit 39, inner passage of gas heat exchanger 36, and a conduit 40 to the lower part of evaporator 12.

The top of condenser trap 24 is connected by a conduit 41 to one end of a vessel 42. The other end of vessel 42 is connected by a conduit 43 to conduit 39 in the evaporator-absorber gas circuit.

The above described system is evacuated and charged with refrigerant fluid, an absorbent therefor, and an inert auxiliary fluid. Ammonia, water, and hydrogen may be used. The ammonia and water are flowed into the system as a solution, and the hydrogen is flowed into the system under a pressure such that the total pressure in the system will be the condensing temperature of ammonia at a fairly high room temperature.

In operation, burner 11 is lighted to heat generator 10. Ammonia vapor is expelled from solution by heating in the generator. Vapor formed in the generator and which rises through conduit 14 causes upward flow of liquid through this conduit by known vapor lift action so that liquid flows by gravity through the rest of the generator-absorber liquid circuit. All the generator vapor flows from the upper end thereof through conduit 15, rectifier 16, and conduit 17 to condenser 18.

Liquid formed by condensation of vapor in condenser section 19 flows through trap 22 and conduit 29 into the upper part of evaporator coil section 28. Liquid formed by condensation of vapor in condenser section 20 flows through trap 23 and conduit 30 into the intermediate part of coil 28. Liquid formed by condensation of vapor in lower condenser section 21 flows through trap 24 and conduit 31 into the bottom part of coil section 28. In operating the system so that a substantially constant temperature is maintained in refrigerator 26, either by manual adjustment of burner 11 or by thermostatic control of burner 11 responsive to a temperature condition affected by the evaporator as known, vapor will be condensed only in the upper sections of the condenser under low load conditions so that liquid will flow from the condenser only into the upper part or parts of evaporator coil section 28, and liquid will be supplied from the condenser to all parts of evaporator coil section 28 only under increased load conditions. Dams 44 are located in evaporator coil section 28 so that, for instance, liquid supplied to the upper part of coil section 28 flows only through this section and thence through conduit 32 to the coil section 27. However, any liquid which enters evaporator coil section 27 will flow downward in this coil section from its point of entrance to such point as it may be used up by evaporation.

Wherever liquid is present in the evaporator coil, it evaporates and diffuses into the hydrogen. In starting operation, liquid first enters coil section 28 so that the addition of heavy ammonia vapor to gas in this coil causes gas circulation to start downward in coil section 28 and gas circulation continues in the direction of the arrows in Fig. 1. The flow is from the lower end of coil section 28 to the absorber 12.

Ammonia vapor is absorbed into absorption liquid in absorber 12. The hydrogen from which ammonia has been absorbed, that is weak gas, returns from the absorber through the gas heat exchanger 36 to the lower end of evaporator coil section 27.

Gas flow is upward through coil section 27 and downward through coil section 28. Ammonia evaporates at a temperature dependent upon the partial pressure of ammonia vapor in the presence of the evaporating liquid. Since weak gas flows first in coil section 27, the partial pressure of ammonia vapor in this coil section is less than the partial pressure of ammonia vapor in coil section 28. Therefore, the temperature of coil section 27 is lower than the temperature of coil section 28.

Figure 2:
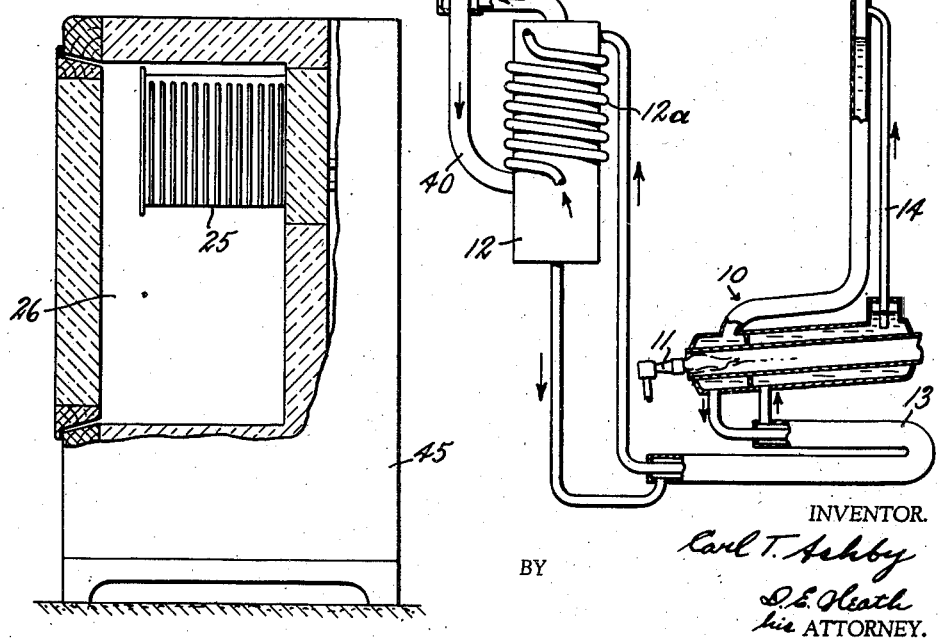
Fig. 2 shows schematically a refrigerator provided with a cooling element embodying the invention.

The evaporator coils shown diagrammatically in Fig. 1 are formed into a usable cooling element which is shown located in a household refrigerator in Fig. 2 and illustrated in detail sections in Figs. 3, 4 and 5. Referring to Fig. 2, and principally to Figs. 3, 4, and 5, the evaporator 25 located in the storage compartment 26 of a refrigerator 45 is formed to provide a low temperature zone for freezing water or the like, and a higher temperature zone for cooling of air in the refrigerator. The evaporator coil section 27 is arranged in good thermal conductive relation with an inner casing 46. Casing 46 forms a plurality of compartments to receive ice freezing trays or the like. As shown, coil section 27 is embedded in an aluminum casting 46. The evaporator coil section 28 is located outside of and around the coil section 27. The coil section 28 is arranged in thermal conductive relation with an outer sheet metal casing 47 provided with heat transfer fins 48. The coil section 28 and its casing 47 shields the inner casing 46 and the low temperature coil section 27 from contact with air in the refrigerator. Between the inner evaporator casing 46 and outer casing 47 is a dead air space which thermally insulates the low temperature or freezing section.

Since substantially none of the air cooling load is imposed upon the low temperature evaporator coil section 27, only a small amount of ammonia evaporates in this coil section when the freezing load thereon is small. Under such conditions the gas entering the higher temperature coil section 28 will contain a relatively small quantity of ammonia vapor so that, under such conditions, the temperature of the part of this coil section which is connected to the low temperature section 27 would be cold, thus lowering the humidity of air in the refrigerator compartment. However, by introducing hot ammonia liquid from the condenser through conduits 29, 30, and 31 at points distributed along the length of coil section 28, the temperature of this coil is maintained higher so that better humidity of air in the refrigerator compartment is obtained even with small load on the freezing coil 27.

Referring again to Fig. 1, when uncondensed ammonia vapor issues from the lower end of condenser 18, as upon increase in temperature of the cooling air, the vapor flows through conduit 41 into vessel 42 and displaces hydrogen from this reserve vessel through conduit 43 into the evaporator-absorber gas circuit so that the total pressure in the system rises to the necessary condensing pressure of ammonia at the increased temperature and refrigeration continues at this increased pressure. Ammonia vapor which condenses in vessel 42 drains through conduit 41, trap 24, and conduit 31 into the lower part of evaporator coil 28.

Various changes and modifications may be made within the scope of the invention as set forth in the following claims.

What is claimed is:

1. A refrigeration system having a plurality of parts in which evaporation of refrigerant liquid occurs to produce refrigeration, means for flowing inert gas through said parts in series, means providing thermal insulation between a first of said parts on one hand and others of said parts on the other, and means for simultaneously introducing liquid refrigerant individually into said other parts, said first part being connected and arranged to receive liquid from said other parts.

2. A refrigeration system having a plurality of parts in which evaporation of refrigerant liquid occurs to produce refrigeration, means for flowing inert gas through said parts in series, means providing thermal insulation between a first of said parts on one hand and others of said parts on the other, means for simultaneously conducting liquid refrigerant individually to said other parts, and means for simultaneously conducting liquid refrigerant individually from said other parts to said first part.

3. A refrigeration system having a plurality of parts in which evaporation of refrigerant liquid occurs to produce refrigeration, means for flowing inert gas through said parts, means for simultaneously conducting liquid refrigerant individually to some of said parts, and means for simultaneously conducting liquid individually from said some parts to another of said parts.

4. A refrigeration system having a plurality of parts in which evaporation of refrigerant liquid occurs to produce refrigeration, means providing thermal insulation between a first of said parts on one hand and others of said parts on the other, a refrigerant fluid liquefier, means for conducting liquefied refrigerant fluid from said liquefier individually and simultaneously to said other parts, means for conducting liquid from said other parts to said first part, and means for flowing inert gas through said first part and then through said other parts.

5. A refrigeration system having a plurality of parts in which evaporation of refrigerant liquid occurs to produce refrigeration, a refrigerant fluid liquefier, means for simultaneously conducting liquefied refrigerant fluid from said liquefier individually to some of said parts, means for simultaneously conducting liquid individually from said some parts to another of said parts, and means for flowing inert gas through said parts.

6. In a refrigerator having a food storage compartment, a refrigeration system having a plurality of parts in which evaporation of refrigerant liquid occurs to produce refrigeration, a freezing chamber in heat transfer relation with a first of said parts, means providing thermal insulation between said first part and said chamber on one hand and others of said parts on the other, said other parts being arranged to cool air in said refrigerator storage compartment, means for simultaneously conducting liquid refrigerant individually to said other parts, means to conduct liquid from said other parts to said first part, and means to flow inert gas through said first part and then through said other parts.

7. A refrigeration system having a plurality of parts in which evaporation of refrigerant liquid occurs to produce refrigeration, a first of said parts being enfolded by and insulated from others of said parts, means for conducting liquid refrigerant individually to said other parts, means to conduct liquid from said other parts to said first part, and means to flow inert gas through said first part countercurrent to flow of liquid therein and then through said other parts concurrent to flow of liquid therein.

8. A refrigeration system having a plurality of parts in which evaporation of refrigerant liquid occurs to produce refrigeration, some of said parts encompassing another of said parts in spaced relation thereto, means providing a dead air space enveloping said other part, means for conducting liquid refrigerant individually to said some parts, means for conducting liquid from said some parts to said other part, and means for flowing inert gas through said other part and then through said some parts.

9. A refrigerator including a cabinet having a storage compartment, a cooling element in said compartment having a plurality of parts in which evaporation of refrigerant liquid occurs to produce refrigeration, one of said parts being encompassed by others of said parts and insulated therefrom, a freezing chamber associated with said one part, said other parts being provided with means for cooling of air in said compartment, means to conduct liquid refrigerant individually to said other parts, means to conduct liquid from said other parts to said one part, and means to flow inert gas through said one part and then through said other parts.

10. A refrigerator cooling element including a freezing chamber, a pipe coil arranged for cooling said chamber, a second pipe coil encompassing said first coil and cooling chamber in spaced relation thereto, a casing thermally associated with said second coil providing exteriorly an air cooling surface and interiorly a dead air space, means for conducting liquid refrigerant individually to different parts of said second coil, means for conducting liquid from said second coil to said first coil, and means for flowing inert gas through said first coil and then through said second coil.

11. A refrigerator cooling element including a freezing chamber, a first pipe coil thermally associated with said chamber, a second pipe coil located about said first coil and freezing chamber and insulated therefrom, said second coil being provided with heat transfer surface for cooling air, means for conducting liquid refrigerant individually to different parts of said second coil, means for conducting liquid from said second coil to said first coil, and means for flowing inert gas through said first coil and then through said second coil.

12. A refrigeration system having two sections in which evaporation of refrigerant liquid occurs to produce refrigeration, one of said sections shielding the other of said sections from ambient air, means for flowing inert gas through said sections, means for conducting liquid refrigerant individually to different parts of said one section, and means for conducting liquid refrigerant individually from said parts to said other section.

13. A refrigeration system having a plurality of thermally separated sections in which evaporation of refrigerant liquid occurs to produce refrigeration, means for flowing inert gas through said sections, means to simultaneously conduct liquid refrigerant individually to different parts of one of said sections, and means to simultaneously conduct liquid individually from said parts to another of said sections.

14. A refrigeration system having a plurality of parts in which evaporation of refrigerant liquid occurs to produce refrigeration at distinctly different temperatures, structure providing thermal insulation between a first of said parts on one hand and others of said parts on the other, structure for introducing warm liquid refrigerant into said other parts, said first part being connected and arranged to receive liquid from said other parts, and means for flowing inert gas through said first part countercurrent to flow of liquid therein and then through said other parts concurrent to flow of liquid therein.

15. A refrigeration system having a plurality of parts in which evaporation of refrigerant liquid occurs to produce refrigeration at distinctly different temperatures, structure for conducting warm liquid refrigerant individually to some of said parts, structure for conducting liquid individually from said some parts to another of said parts, and means for flowing inert gas first through said another part and then concurrent to flow of liquid in said some parts.

16. A refrigeration system having a plurality of thermally separated sections in which evaporation of refrigerant liquid occurs to produce refrigeration at distinctly different temperatures, structure to conduct warm liquid refrigerant individually to different parts of one of said sections, structure to conduct liquid individually from said parts to another of said sections, and means for flowing inert gas first through said another section and then concurrent to flow of liquid in said different parts of said one section.

17. A refrigeration system having a plurality of thermally separated sections in which evaporation of refrigerant liquid occurs to produce refrigeration at distinctly different temperatures, structure to conduct warm liquid refrigerant to one of said sections and thence to another of said sections, and means for flowing inert gas first through said another section and then concurrent to flow of liquid in said one section.

18. A refrigeration system having a cooling element including a first pipe coil and a second pipe coil, a refrigerant fluid liquefier, means for simultaneously conducting liquid refrigerant from said liquefier individually to different parts of said second coil, and means for simultaneously conducting liquid individually from said parts to said first coil.

CARL T. ASHBY.